(12) United States Patent
Yamashita et al.

(10) Patent No.: US 8,269,391 B2
(45) Date of Patent: Sep. 18, 2012

(54) MICRO ROTOR AND ROTARY ELECTRIC MACHINE INCORPORATING SAME

(75) Inventors: Fumitoshi Yamashita, Miyota-machi (JP); Shinsaku Nishimura, Miyota-machi (JP); Noboru Menjo, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 291 days.

(21) Appl. No.: 12/791,467

(22) Filed: Jun. 1, 2010

(65) Prior Publication Data
US 2010/0308679 A1 Dec. 9, 2010

(30) Foreign Application Priority Data

Jun. 9, 2009 (JP) .................................. 2009-137772

(51) Int. Cl.
*H02K 21/12* (2006.01)
(52) U.S. Cl. .................................................. 310/156.45
(58) Field of Classification Search ............. 310/156.25, 310/156.27, 156.45, 156.43, 40 MM
See application file for complete search history.

(56) References Cited

U.S. PATENT DOCUMENTS

| | | | | | |
|---|---|---|---|---|---|
| 4,667,123 | A | * | 5/1987 | Denk et al. | 310/156.22 |
| 5,710,474 | A | * | 1/1998 | Mulgrave | 310/216.002 |
| 6,104,115 | A | * | 8/2000 | Offringa et al. | 310/156.28 |
| 6,831,384 | B2 | * | 12/2004 | Ries et al. | 310/90.5 |
| 6,889,419 | B2 | * | 5/2005 | Reiter et al. | 29/596 |
| 7,228,615 | B2 | * | 6/2007 | Nilson | 29/598 |
| 7,880,356 | B2 | * | 2/2011 | Takeuchi | 310/156.43 |

FOREIGN PATENT DOCUMENTS

| | | |
|---|---|---|
| JP | A 9-501820 | 2/1997 |
| JP | A 11-288812 | 10/1999 |
| JP | A 2002-532047 | 9/2002 |
| WO | WO 95/33296 | 12/1995 |
| WO | WO 00/33446 | 6/2000 |

OTHER PUBLICATIONS

Ohta et al., *Mitsubishi Electric Corp. Technical Report*, vol. 75, p. 703, 2001. (with partial English-language translation).
Raisigel et al., "Magnetic Planar Micro-Generator", 18th International Workshop on High Performance Magnets and their Applications, Annecy, France, pp. 942-944, Aug. 29-Sep. 2, 2004.

(Continued)

*Primary Examiner* — Dang Le
(74) *Attorney, Agent, or Firm* — Oliff & Berridge, PLC

(57) ABSTRACT

A micro rotor is disclosed and includes a plurality of circular or annular plate-shaped thick film magnets which each include an isotropic magnet with a thickness $t_1$ having an in-plane remanence Mr of 0.95 T or more and a coercivity HcJ of 400 kA/m or more and a non-magnetic material with a thickness $t_2$ adapted to isolate two adjacent isotropic magnets where the ratio of $t_1/t_2$ is eight or more and which are stacked on one another in multiple layers in the rotation axis direction, wherein at least two pole pairs are provided and a mean magnetic path of in-plane direction having a permeance $(B/\mu oH)$ of five or more achieved by the magnet alone is provided, whereby eddy current is reduced. Also disclosed are a radial gap type brushless DC motor, a PM stepping motor and an electric generator which incorporate the above described micro rotor.

11 Claims, 11 Drawing Sheets

OTHER PUBLICATIONS

Nakano et al., "Application of PLD-Made Nd-Fe-B Film Magnets", 18th International Workshop on High Performance Magnets and their Applications, Annecy, France, pp. 723-726, Aug. 29-Sep. 2, 2004.

Itoh, "Ultra-Small Electromagnetic Motors and Micro-Generators, and Their Application to Micromachines", *Journal of the Magnetics Society of Japan*, vol. 18, pp. 922-927, 1994. (with English-language abstract).

Hinz et al., "High Performance NdFeB Magnets with a Thickness of Some 100 μm for MEMS Applications", 18th International Workshop on High Performance Magnets and their Applications, Annecy, France, pp. 76-83, Aug. 29-Sep. 2, 2004.

Delamare et al., "Magnetic Down-Scaling Laws, Micro-Magnets and Applications of Magnetic Micro-Actuators (MAGMAS)", 18th International Workshop on High Performance Magnets and their Applications, Annecy, France, pp. 767-778, Aug. 29-Sep. 2, 2004.

Topfer et al., "NdFeB Thick Films for MAGMAS Applications", 18th International Workshop on High Performance Magnets and their Applications, Annecy, France, pp. 942-944, Aug. 29-Sep. 2, 2004.

Yamashita, "Recent Examples of Efficient Small Rare-Earth Magnet Motors", Materials for the 143rd Workshop of the Applied Magnetics Society of Japan, Surugadai Kinenkan of Chuo University, 2005. (with English-language abstract).

Komura et al., "Fine Pole-Pitch Magnetizing Method for Nd-Fe-B Isotropic Magnet with High Coercivity", *Journal of Applied Physics*, vol. 101, 09K104, 2007.

* cited by examiner

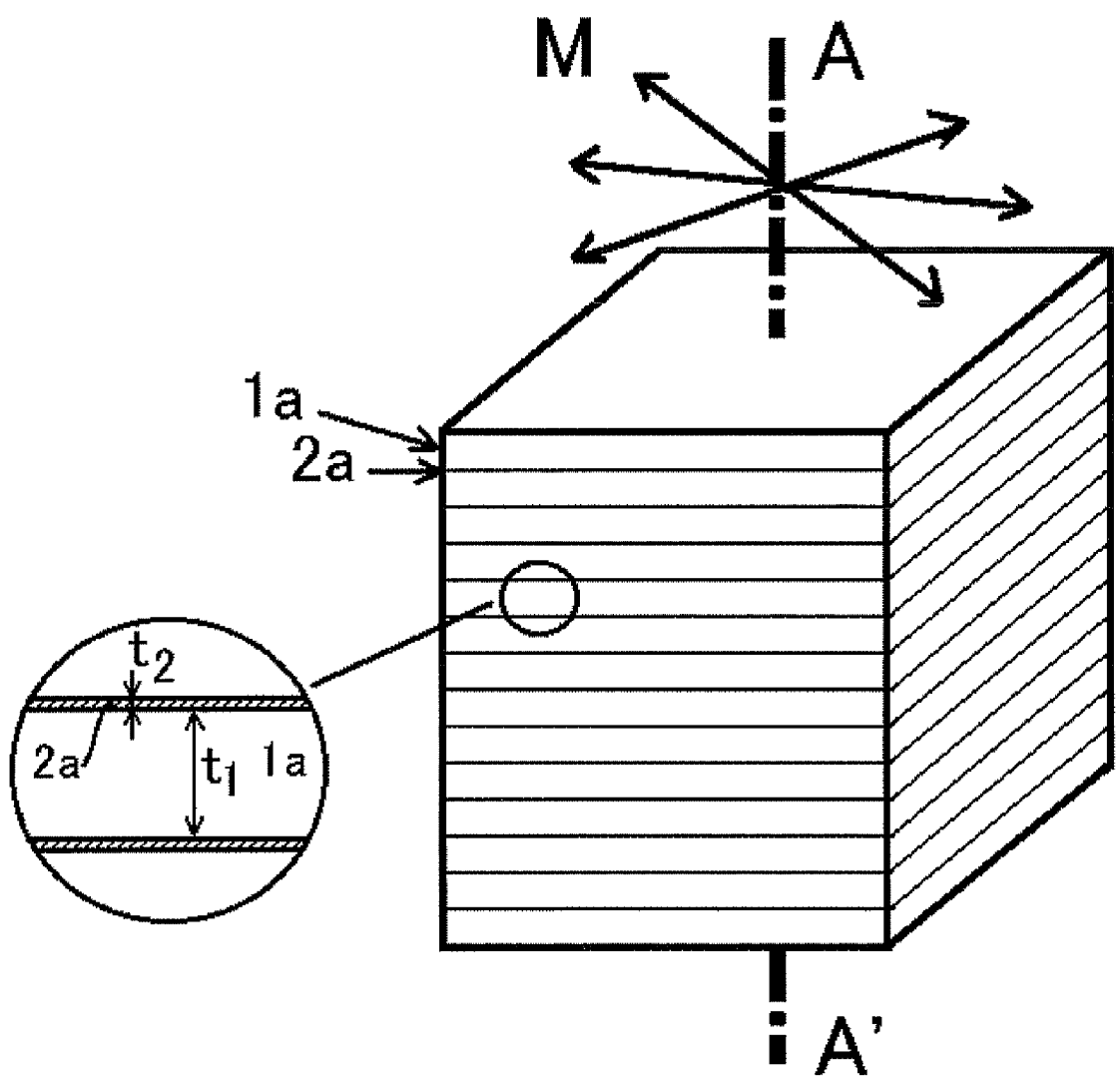

$Fe_{49}Pt_{51}$

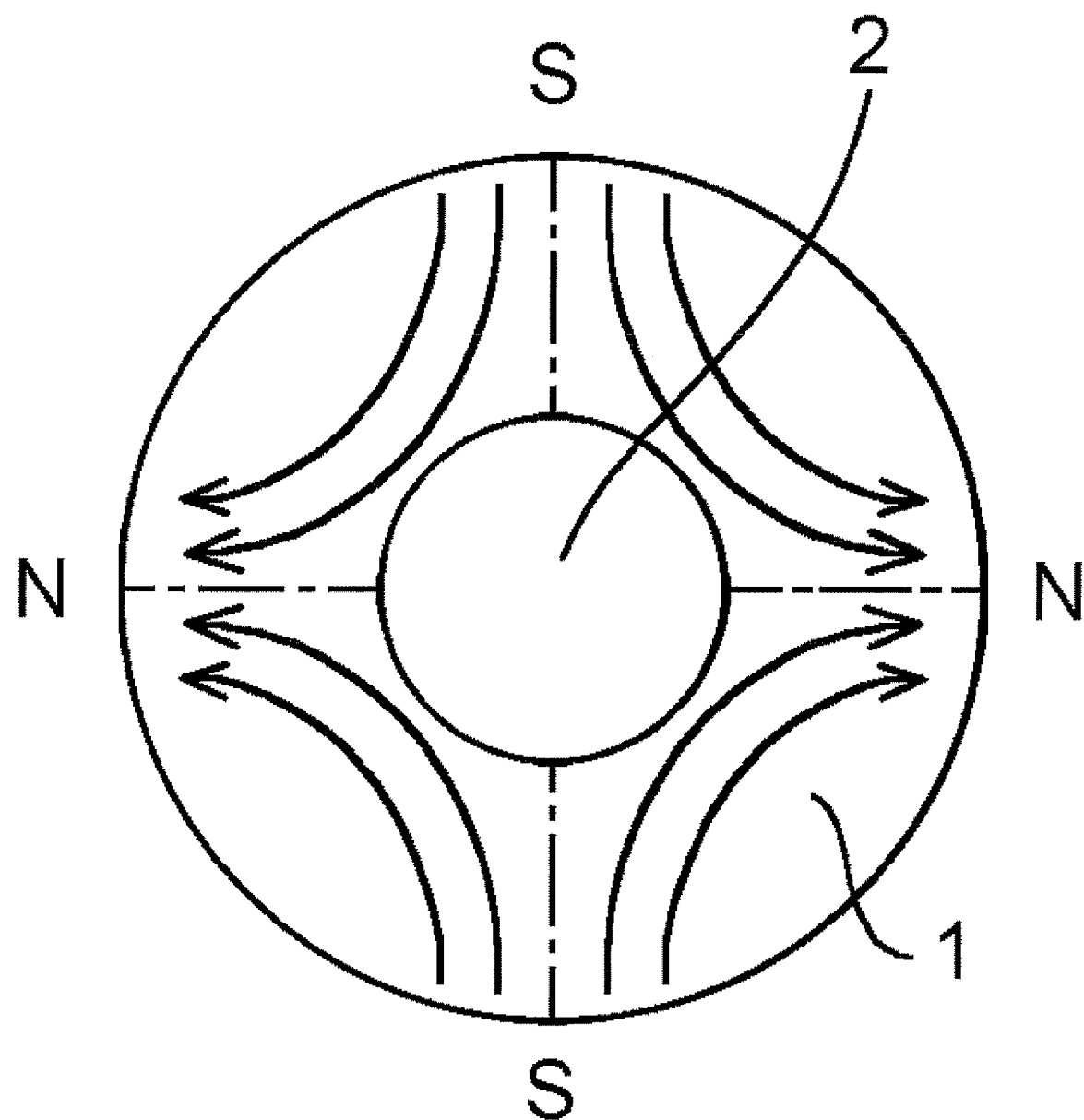

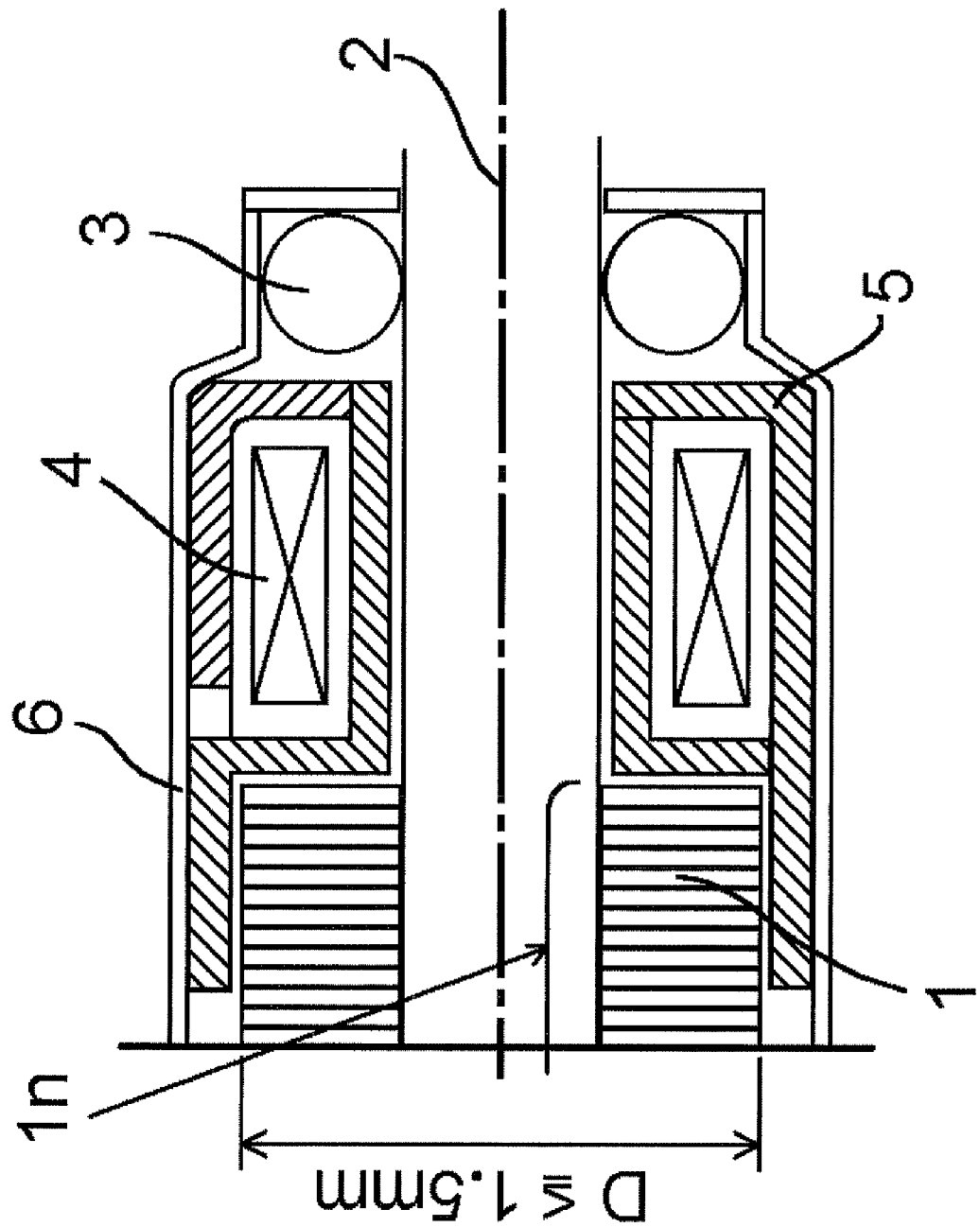

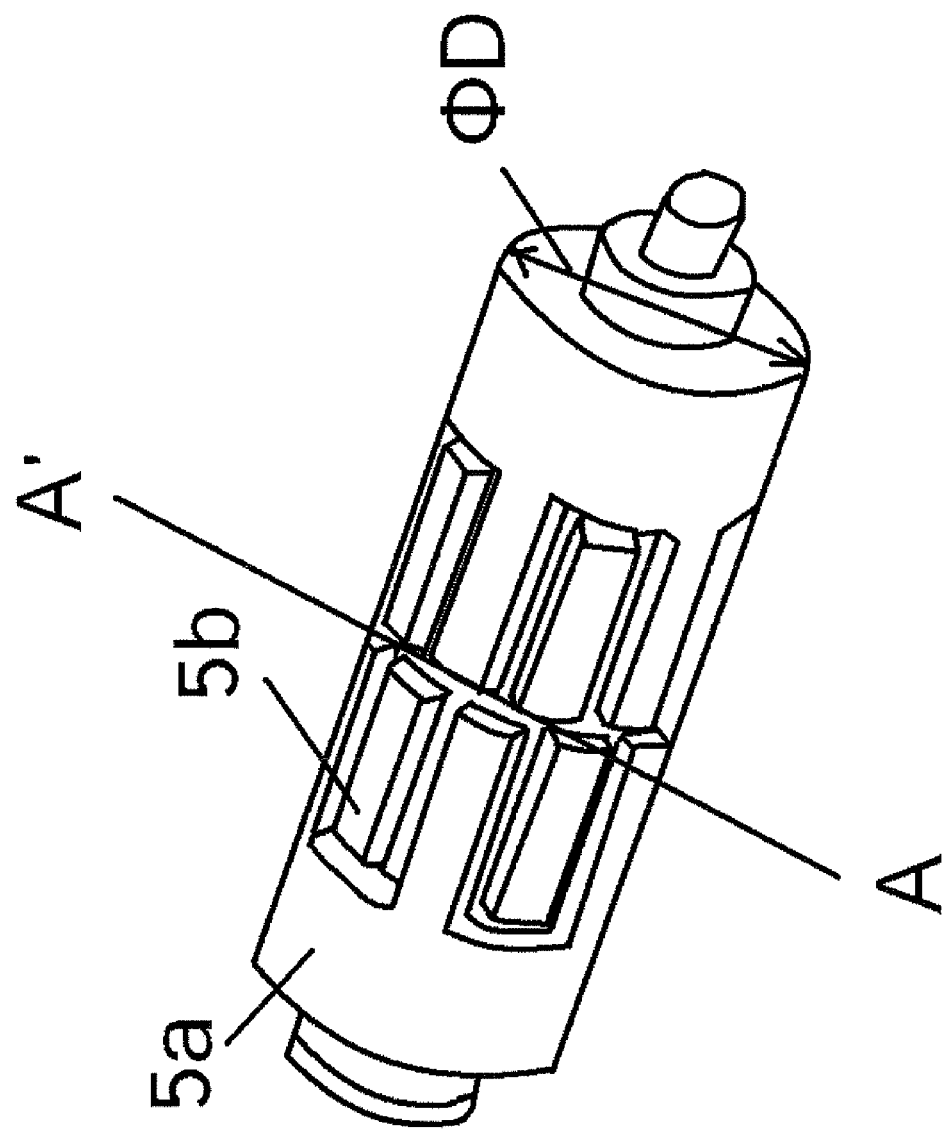

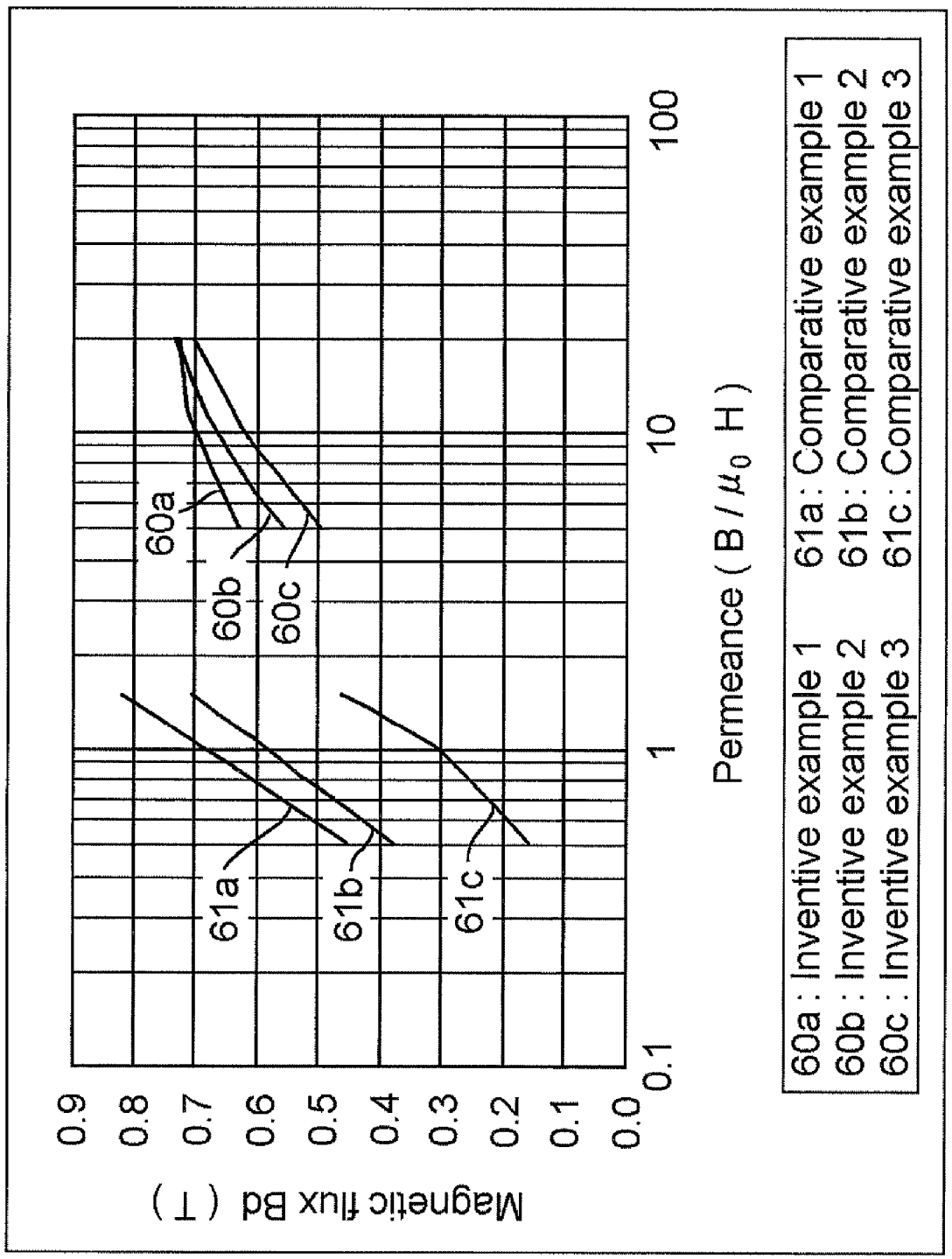

MICRO ROTOR AND ROTARY ELECTRIC MACHINE INCORPORATING SAME

BACKGROUND OF THE INVENTION

1. Field of the Invention

The present invention relates to a micro rotor, particularly to a micro rotor which is fabricated from an isolated lamination thick film magnet structured of multiple layers each layer including an isotropic magnet with a high remanence Mr and a non-magnetic material to isolate two adjacent isotropic magnets, which has a pole pair number of two or more and which includes a mean magnetic path of in-plane direction having a permeance ($B/\mu_0 H$) of five or more achieved by the magnet alone, and further relates to a rotary electric machine which incorporates such a micro rotor.

2. Description of the Related Art

A rotary electric machine for application in, for example, the field of information and telecommunication devices has been commercially produced with its volume reduced to about 100 mm$^3$ and is widely used. Such a rotary electric machine is requested to be further downsized in order to reduce the size, thickness, weight and power consumption of a drive source of electric and electronic devices or robots for application in the fields of automobiles, home information appliances, communication devices, precision measurement instruments, medical and welfare equipment, and the like.

PCT Patent Application Laid-Open No. H9-501820, for example, discloses a radial gap type brushless DC motor (RG-BLM) with an outer diameter of 1 mm or less and an axial length of 2 mm or less, which includes a hollow circular cylinder having a conductive cylindrical wall with slots and functioning as an excitation winding, and which is applied to an intravascular ultrasonography system. Also, PCT Patent Application Laid-Open No. 2002-532047 discloses a fluid-cooled RG-BLM which has an outer diameter of 8 mm or less and thus can be introduced into a vascular system of a body to thereby drive a blood pump located in the body, and in which an excitation winding is molded by resin containing $Al_2O_3$ thereby enhancing heat dissipation performance thus enabling achievement of an output of 5 W at 30,000 rpm.

As an example of the micro rotary electric machine as described above, a brushless DC motor is known which has a volume of 4 mm$^3$ with an outer diameter of 1.6 mm and an axial length of 2 mm wherein a one-pole pair rotor having an outer diameter of 0.76 mm and including an $Nd_2Fe_{14}B$ sintered magnet produced by electric discharge machining is coupled to a stator (refer to Non-Patent Document 1). Also known are a brushless DC motor with a volume of 62 mm$^3$ (an outer diameter of 6 mm and an axial length of 2.2 mm) proposed by H. Raisigel (refer to Non-Patent Document 2), further a brushless DC motor with a volume of 20 mm$^3$ (an outer diameter of 5 mm and an axial length of 1 mm) proposed by M. Nakano (refer to Non-Patent Document 3), and still further a brushless DC motor with a volume of 0.6 mm$^3$ (an outer diameter of 0.8 mm and an axial length of 1.2 mm) proposed by T. Ito (refer to Non-Patent Document 4). The rotary electric machines described above undergo a significant decrease in torque due to the volume reduction according to the scaling law.

Various proposals have been presented for a magnet as a micro rotor for use in the rotary electric machines as described above. For example, D. Hinz, et al. introduce a micro rotor made of an $Nd_2Fe_{14}B$ system magnet with a thickness of 300 μm, which is die-upset at 750° C. and which has a remanence Mr=1.25 T, a coercive force HcJ=1.06 MA/m, and a (BH)max=290 kJ/m$^3$ (refer to Non-Patent Document 5). Also, J. Delamere, et al. represent that a torque of 0.001 mNm is generated by a motor which includes a micro rotor made of an SmCo system magnet having eight pole pairs and a stator disposed to oppose the rotor component and which is driven at 100,000 rpm, or that an electric power of 1 W is produced by an electric generator structured identically to the motor described above when driven at 150,000 rpm (refer to Non-Patent Document 6). Further, Topfer, T. Speliotis, et al. report a so-called Power MEMS motor adapted to generate a torque of 0.055 mNm and structured to include a micro rotor made of an $Nd_2Fe_{14}B$ bonded magnet which is screen-printed on an Fe—Si substrate with a diameter of 10 mm so as to have a thickness of 500 μm, and which has a remanence Mr=0.42 T, and a $(BH)_{max}$=15.8 kJ/m$^3$ (refer to Non-Patent Document 8).

In terms of torque per volume, that is torque density, of a rotary electric machine, a radial gap type has an advantage over an axial gap type (refer to Non-Patent Document 9). However, a radial gap type rotary electric machine including a slotless iron core suffers an increase in magnetoresistance due to the gap.

Torque is proportional to the number of pole pairs, and mechanical output P (W) is represented by a product of constant k=0.1047 (=π/30), revolution number N (r/min) and torque T (Nm). This suggests that in order to compensate for a decrease of the output P resulting from the miniaturization of a rotary electric machine, it is required that (1) a magnet has a high remanence, (2) magnetization is performed with a high permeance ($B/\mu_0 H$) for two or more pole pairs in the radial direction, and that (3) eddy current loss due to a high speed rotation is reduced.

The micro rotor for the above radial gap type electric rotary machine has a diameter of about 1.6 mm or less. Accordingly, the die-upset magnet of D. Hinz et al. with a remanence Mr=1.25, like an $Nd_2Fe_{14}B$ system anisotropic sintered magnet, is magnetically constrained to a C-axis orientation in one single direction. Consequently, the magnetization in the radial direction is limited to one pole pair (=two poles), and also the permeance ($B/\mu_0 H$) cannot be set high because of restriction of magnetic path (configuration). Further, the electric specific resistance of the magnet is low, like nearly 10$^{-5}$ Ωcm, thus failing to enable suppression of eddy current loss due to a high rotation speed.

On the other hand, the screen-printed $Nd_2Fe_{14}B$ bonded magnet of Topfer, T. Speliotis et al. is magnetically isotropic and therefore if the magnet is magnetized with two or more pole pairs in the radial direction and also with more poles than anisotropic magnets fabricated by the die-upset method or the sintering method, a magnetization with a high permeance ($B/\mu_0 H$) is enabled. Moreover, since the screen-printed $Nd_2Fe_{14}B$ bonded magnet achieves an electric specific resistance of nearly 10$^{-1}$ Ωcm, which is comparable to that of a laminated magnetic steel sheet, the eddy current loss due to a high rotation speed can be suppressed. The screen-printed $Nd_2Fe_{14}B$ bonded magnet, however, has a remanence of 0.42 T that is lower than that of the anisotropic magnets fabricated by the die-upset method or the sintering method, which results in that in the static magnetic field generated from a micro rotor, a torque produced by a rotary electric machine incorporating the screen-printed $Nd_2Fe_{14}B$ bonded magnet is about one third as large as a torque produced by a rotary electric machine which, while having the same figure and structure, incorporates the anisotropic magnet.

With regard to magnetization with two or more pole pairs, for example, H. Komura, et al. report a multi-polar magnetization where an $Nd_2Fe_{14}B$ isotropic bonded magnet, which is fabricated such that an $Nd_2Fe_{14}B$ isotropic magnetic powder made from a rapidly solidified melt-spun thin ribbon is cured with an epoxy resin and which has a remanence Mr of about 0.62 to 0.68 T, is heated up to 320° C. (Curie Temperature) or higher and then cooled in the magnetic field (Non-Patent Document 9). Though the magnet of H. Kimura, et al has a higher remanence than the example reported by Topfer, T. Speliotis, et al, it is difficult for the radial gap type micro rotary electric machine incorporating the magnet of H. Kimura, et al. to achieve a torque equivalent to or higher than a torque produced by a comparable rotary electric machine incorporating the die-upset or sintered anisotropic magnet. Furthermore, if epoxy resin is to be heated above the Curie Temperature of magnet material that exceeds the decomposition temperature of the epoxy resin, then not only the magnet material applicable must be limited, but also the mechanical strength of magnet deteriorates due to the carbonization of resin component to solidify the magnet material or eddy current loss is increased at a high rotation speed due to the decrease of electric specific resistance. Consequently, the magnet of H. Kimura, et al. is not suitable as a micro rotor in terms of increasing a torque and also achieving an increased output by means of increasing the rotation speed.

Non-Patent Documents which have so far been cited and/or will hereafter be cited are listed as follows:
<Non-Patent Document 1> Mitsubishi Electric Corp. Technical Report-Volume 75 (2001), pp. 703-708, by S. Ohta, T. Obara, Y. Toda and M. Takeda
<Non-Patent Document 2> Proceedings of the 18th International Workshop on High Performance Magnets and Their Applications, Annecy, France (2004), pp. 942-944, by H. Raisigel, O. Wiss, N. Achotte, O. Cugat and J. Delamare
<Non-Patent Document 3> Proceedings of the 18th International Workshop on High Performance Magnets and Their Applications, Annecy, France (2004), pp. 723-726, by M. Nakano, S, Sato, R. Kato, H. Fukunaga, F. Yamashita, S. Hoefinger and J. Fidler
<Non-Patent Document 4> Journal of the Magnetics Society of Japan-Volume 18 (1994), pp. 922-927, by T. Ito
<Non-Patent Document 5> Proceedings of the 18th International Workshop on High Performance Magnets and Their Applications, Annecy, France (2004), pp. 76-83, by D. Hinz, O. Gutfleisch and K. H. Muller
<Non-Patent Document 6> Proceedings of the 18th International Workshop on High Performance Magnets and Their Applications, Annecy, France (2004), pp. 767-778, by J. Delamare, G. Reyne and O. Cugat
<Non-Patent Document 7> Materials for the 143rd Workshop of the Applied Magnetics Society of Japan, Surugadai Kinenkan of Chuo University (2005), by F. Yamashita
<Non-Patent Document 8> Proceedings of the 18th International Workshop on High Performance Magnets and Their Applications, Annecy, France (2004), pp. 942-944, by Toepfer, B. Pawlowski, D. Scha and B. Bel
<Non-Patent Document 9> Journal of Applied Physics-Volume 101 (2007), 09K104, by H. Komura, M. Kitaoka, T. Kiyomiya and Y. Matsuo It is relatively easy to increase by about 10% the remanence Mr of a micro magnet, for example, the anisotropic magnet of D. Hinz et al. (refer to Non-Patent Document 5) having a remanence Mr of 1.25 T, but the number of pole pair is limited to one and so it is impossible or extremely difficult for the magnet to be magnetized with a high permeance (B/μoH) and also to achieve a high electric specific resistance.

The torque of a rotary electric machine incorporating the above anisotropic magnet can be increased by enhancing the remanence Mr of the magnet, but such a rotary electric machine is disadvantageous in terms of increasing rotation speed due to S-T (Speed-Torque) drooping characteristic. The magnet of D. Hinz et al., particularly, has an electric specific resistance of about $10^{-5}$ Ωcm, and therefore it may happen that eddy current is increased due to a high speed rotation and heat energy is generated so as to raise the temperature of the component of a rotor thereby possibly causing thermal demagnetization. Thus, anisotropic magnets fabricated by the die-upset method or the sintering method, which are known to achieve a high remanence Mr, have the technical problems that it is difficult to increase torque by means of increasing the number of pole pairs, also loss is increased when the rotation speed is increased, and furthermore that output is decreased due to demagnetization.

Meanwhile, Topfer, T. Speliotis et al. introduce a rotary electric machine which incorporates a bonded magnet for a micro rotor having an electric specific resistance of nearly $10^{-1}$ Ωcm and a remanence Mr of about 0.42 T, whereby eddy current is suppressed so as to achieve a higher rotation speed (refer to Non-Patent Documents 7 and 8). However, such a magnet as described above having a remanence of about 0.42 T generates a static magnetic field that is rather weak for the magnet to be used as a micro rotor incorporated in a radial gap type rotary electric machine usually having a slotless structure with an inherent high reluctance, which raises the technical problem that the above described bonded magnet, even if provided with two or more pole pairs, has a greater tendency to have a torque deficiency than a micro rotor having a remanence Mr of 1.25 T or more With regard to multi-polar magnetizing a magnet with two or more pole pairs in the radial direction, for example, H. Komura, et al. report a multi-polar magnetization where a bonded magnet, which is fabricated such that an $Nd_2Fe_{14}B$ system isotropic magnetic powder made from a rapidly solidified thin ribbon is cured with epoxy resin and which has a remanence Mr of about 0.62 to 0.68 T, has an electric specific resistance of about $10^2$ Ωcm and therefore the problem associated with eddy current can be avoided. But the $Nd_2Fe_{14}B$ system magnetic powder and the epoxy resin inevitably suffer thermal degradation during the magnetization process in which they are heated up to 320° C. (Curie temperature) or higher and then cooled in the magnetic field. Also, when part of Fe in $Nd_2Fe_{14}B$ is Co-substituted like $Nd_2(Fe, Co)_{14}B$, the Curie temperature is raised by about 10° C. per Co atom %. For example, when about 16 atom % of Fe is Co-substituted, the Curie temperature becomes about 470° C., thus the selection of magnet material is restricted according to the Curie temperature. Further, the mechanical strength as a micro rotor is lowered, and the eddy current loss is increased at a high speed rotation. Moreover, the above bonded magnet having a remanence Mr of 0.62 to 0.68 T, when used as a micro rotor of a rotary electric machine, has the same technical problem as the magnet of Topfer, T. Speliotis et al. that a sufficient torque is not developed as compared with the magnet having a remanence Mr of 1.25 T.

With respect to a micro rotor for the radial gap type rotary electric machine which, as described above, is adapted to achieve a higher torque than an axial gap type rotary electric machine: (1) a magnet structure is scarcely known that is magnetically isotropic, has a high remanence of 0.95 T or more and that has its reluctance minimized in the magnetization direction; also (2) a practical magnet structure is scarcely known in which magnets are isolated in the rotation axis direction and which includes a magnetic path having a permeance (B/μoH) of five or more achieved by the magnet alone, wherein effective magnetic flux is generated dynamically; on the other hand (3) while the number of pole pairs of an anisotropic magnet is restricted to one, the magnet according to the present invention can be provided with two or more pole pairs thereby increasing torque of a resultant rotary electric machine; and further (4) a magnet structure includes a plurality of magnets stacked on one another in the rotation axis direction thereby enabling suppression of eddy current due to a high speed rotation.

There is practically no publicly known technology that can cope properly with the above problems or situations (1) to (4) simultaneously.

SUMMARY OF THE INVENTION

The present invention has been made in light of the above circumstances and it is an object of the present invention to provide a micro rotor which successfully copes with the problems or situations described above, and also a rotary electric machine incorporating such a micro rotor.

In order to achieve the object described above, according to one aspect of the present invention, there is provided a micro rotor including a plurality of either circular or annular plate-shaped thick film magnets which each include an isotropic magnet with a thickness $t_1$ having an in-plane remanence Mr of 0.95 T or more and a coercivity HcJ of 400 kA/m or more and a non-magnetic material with a thickness $t_2$ adapted to isolate two adjacent isotropic magnets where a ratio of $t_1/t_2$ is eight or more and which are stacked on one another in multiple layers in the rotation axis direction such that the non-magnetic material is located between the two adjacent isotropic magnets, wherein at least two pole pairs are provided and a mean magnetic path of in-plane direction is provided which has a permeance (B/μoH) of five or more achieved by the magnet alone. Here, the permeance (B/μoH) represents the degree of magnetic flux permeability and is defined as the reciprocal of magnetoresistance. That is to say, the permeance (B/μoH) corresponds to the degree of electrical conductivity (reciprocal of the electrical resistance) if expressed by analogy with electrical system when electric current is put in the place of the magnetic flux.

In the aspect of the present invention, the thick film magnet may be constituted such that the isotropic magnet is formed by a physical deposition method on the non-magnetic material as a substrate, and that the isotropic magnet formed is subjected to heat treatment as appropriate, whereby the resultant magnet achieves an in-plane remanence Mr of 0.95 T or more and a coercivity HcJ of 400 kA/m or more.

In the aspect of the present invention, the thick film magnet may be constituted such that the isotropic magnet is formed by depositing a disordered Fe—Pt system alloy and then formed into an ordered Fe—Pt system alloy, or may be constituted such that the isotropic magnet includes an αFe and a crystallized $R_2TM_{14}B$ which are formed in such a manner that an αFe having an average deposition layer thickness of 60 nm or less and an R-TM-B having an average deposit layer thickness of 60 nm or less are deposited alternately on each other and then subjected to heat treatment.

In the aspect of the present invention, the thick film magnet may be constituted such that the isotropic magnet includes a rapidly-solidified thin ribbon formed by either crystallizing or nitriding a molten alloy of one of an R-TM-B (R is one of Nd and Pr, and TM is one of Fe and Co) system alloy and an Sm—Fe system alloy, and that the non-magnetic material includes a non-magnetic metal coated by a physical deposition method on a surface of the thin ribbon having an in-plane remanence Mr of 0.95 T or more and a coercivity HcJ of 400 kA/m or more.

In the aspect of the present invention, the non-magnetic material may include one of Ta and a Ta buffer layer in order to ensure the achievement of an in-plane remanence Mr of 0.95 T or more and a coercivity HcJ of 400 kA/m or more.

In order to achieve the object described above, according to another aspect of the present invention, there is provided a micro rotary electric machine, such as a slotless radial gap type brushless DC motor, a PM stepping motor or an electric generator, which incorporates the above described micro rotor. The rotary electric machines described above according to the present invention can be suitably used in information equipment, medical instruments, industrial instruments, lens driving devices for endoscopic instruments, self-running inspection robots in tubules, and other micro-machine power devices and can contribute to enhancing the performance of the various rotary electric machines in view of high output, low power consumption and the like compared to rotary electric machines using conventional components of a micro rotor.

BRIEF DESCRIPTION OF THE DRAWINGS

FIG. 1A is a schematic view of reluctance distribution of a lamination thick film magnet structure isolated by a non-magnet material according to the present invention.

FIG. 5A is a schematic view of the thick film magnet having two pole pairs and a permeance B/μoH of five, FIG. 5B is a cross sectional view of a rotary electric machine including a micro rotor fabricated from the isolated lamination thick film magnet according to the present invention, and FIG. 5C is a perspective view of the rotary electric machine; and FIG. 6 is a characteristic chart of a relationship between magnetic flux Bd and permeance (B/μoH) on Embodiment Examples as well as Comparative Examples.

DETAILED DESCRIPTION OF THE INVENTION

Figure 1B:
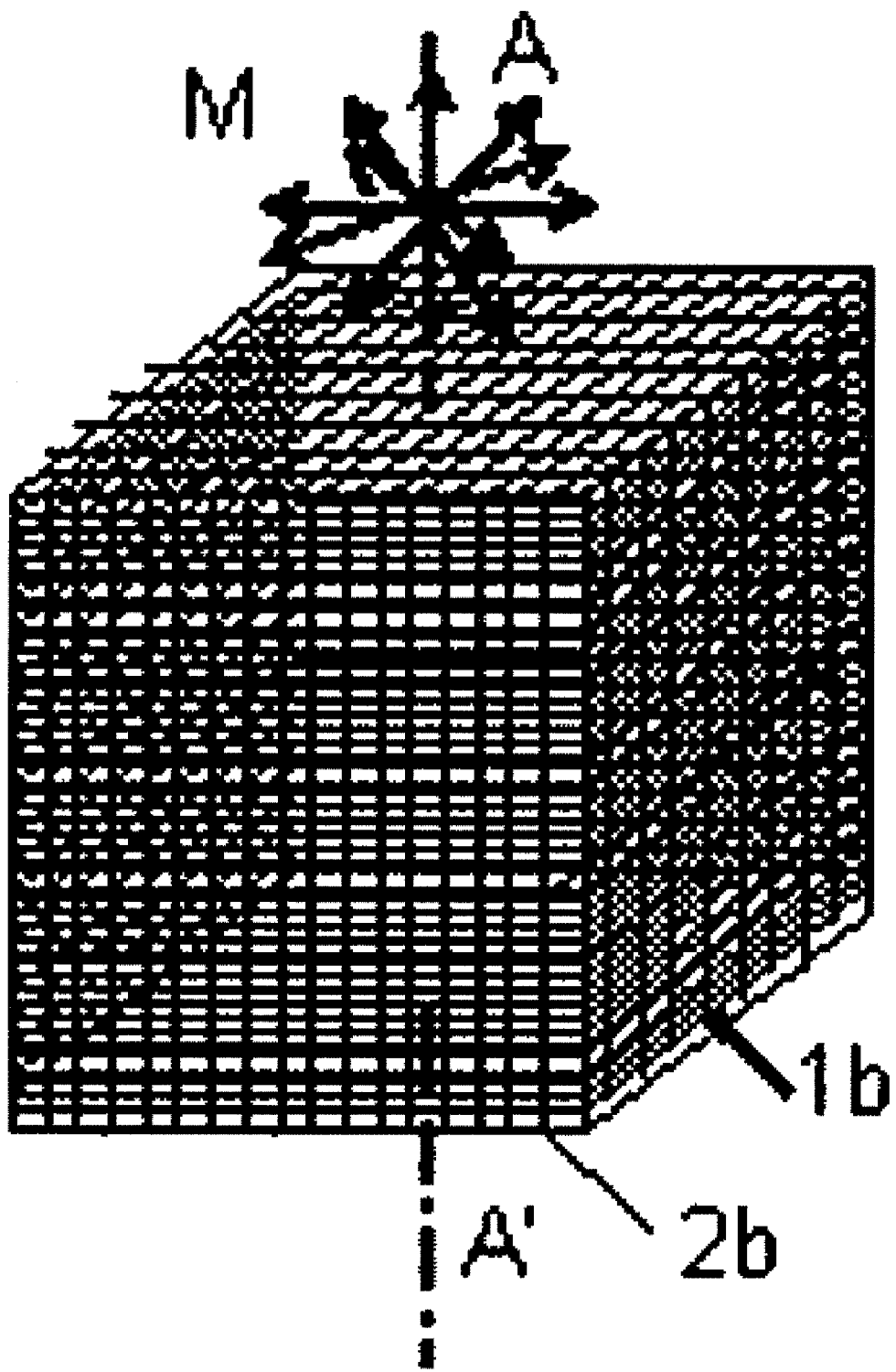
FIGS. 1B and 1C are schematic views of reluctance distribution of conventional magnets.

The present invention will be described with reference to the accompanying drawings. A detailed description will be made of an isolated lamination thick film magnet according to the present invention which is used as a micro rotor, has two or more pole pairs and includes a an in-plane direction mean magnetic path with a permeance (B/μoH) of five or more achieved by a magnet alone by itself, and which is structured such that a plurality of thick film magnets having a circular or annular plate shape are stacked on one another in the rotation axis rotation direction in a multilayer manner. Each of the thick film magnets includes an isotropic magnet with a thickness $t_1$ having a remanence Mr of 0.95 T or more and a coercivity HcJ of 400 kA/m or more and a non-magnetic material with a thickness $t_2$, provided for isolation between each adjacent two of the isotropic magnets, wherein the ratio of $t_1/t_2$ is set at eight or more.

First, according to the present invention, the isotropic magnet of the thick film magnet having a remanence Mr of 0.95 or more and a coercivity HcJ of 400 kA/m or more may be formed such that an Fe—Pt system alloy, F-TM-B system alloy (B is Nd or Pr, and TM is Fe or Co) or the like is coated by a physical deposition method onto a surface of a substrate of non-magnetic metal as a non-magnetic material and then the Fe—Pt system alloy or F-TM-B system alloy coated on the non-magnetic substrate is appropriately subjected to heat treatment whereby an order-disorder transformation or a crystallization takes place thereby optimizing the magnetic properties of the magnet.

Specifically, for example, when an $Fe_{50}Pt_{50}$ alloy is coated on a substrate by a physical deposition method such as PLD (Pulsed Laser Deposition) so as to have a thickness eight times or more as large as the thickness of the substrate, a disordered $Fe_{50}Pt_{50}$ alloy having a saturation magnetization Ms of 1.5 T or more is formed. And, the disordered $Fe_{50}Pt_{50}$ alloy, if heated, for example, to 400° C. and thereby caused to undergo order-disorder transformation, is formed into an ordered $Fe_{50}Pt_{50}$ alloy having a coercivity HcJ of about 500 kA/m, wherein the isotropic magnet achieves an in-plane remanence Mr of above 1 T.

In this connection, if an $R_2TM_{14}B$ (R is Nd or Pr, and TM is Fe or Co) and an αFe having a high saturation magnetization Ms and adapted to be exchange-coupled to the $R_2TM_{14}B$ are present, the αFe first undergoes magnetization inversion in an inverted magnetic field thus failing to achieve a high coercivity HcJ. However, if the grain size of the αFe is set equal to or smaller than the width of a magnetic wall, a non-uniform magnetization inversion in the inverted magnetic filed is reduced, which results in that the coercivity HcJ is dominated by the magnetic anisotropy Ha of the $R_2TM_{14}B$ thus suppressing the decrease of the coercivity HcJ. Also, in order to achieve an increased magnetic flux from the αFe, the volume ratio of the αFe in the magnet must be increased, which requires the minimization of the grain size of the $R_2TM_{14}B$. While the grain size of the $R_2TM_{14}B$ may also be equal to or smaller than the magnetic wall width, too small grain size thereof makes it difficult to maintain the coercivity HcJ. Therefore, the grain size of the $R_2TM_{14}B$ should be set closer to the magnetic wall width. The magnetic wall width is estimated by: $\pi(A/Ku)^{1/2}$ where A is a stiffness constant and Ku is a magnetic anisotropy energy. For example, the αFe and the $R_2TM_{14}B$ are to have respective grain sizes of about 60 nm and several nm. Thus, the average deposition layer thickness of the αFe is set at 60 nm or less and the average deposition layer thickness of the R-TM-B is set at 60 nm or less, wherein the both deposition layers structured as described above are deposited alternately on each other in $10^3$ or more layers and then the alternately deposited layers are subjected to heat treatment thereby forming an αFe and a crystallized $R_2TM_{14}B$. Then, an isotropic magnet is fabricated such that the αFe and the crystallized $R_2TM_{14}B$ which are formed as described above and which both have a thickness of 20 nm are alternately deposited on each other in $10^3$ or more layers, and an in-plane remanence Mr of above 1 T and a coercivity HcJ of as large as 400 kA/m can be achieved by the isotropic magnet fabricated as described above. In this connection, according to a detailed computer simulation where a sufficient magnetic connection is provided at the contact interface between the αF and the $R_2TM_{14}B$ and where respective thicknesses thereof are set to about the magnetic wall width, if a uniform nanocomposite texture having a grain size of about 10 nm can be formed, then the $(BH)_{max}$ can be expected to reach about 200 kJ/m³.

Further, in the present invention, the thick film magnet may be of integration type structure in which an isotropic magnet is formed integrally with a non-magnetic material in such manner that a non-magnetic metal is coated by a physical deposition method onto a surface of a thin ribbon which is formed such that a melt-spun ribbon made of a molten alloy of an R-TM-B (R is Nd or Pr and TM is Fe or Co) system alloy or an Sm—Fe system alloy is crystallized or nitrided and which has magnetic properties optimized. For example, an in-plane remanence Mr of 0.95 T, a coercivity HcJ of 645 kA/m and a $(BH)_{max}$ of 138 kJ/m³ can be achieved by an isotropic magnet of a thick film magnet of integration type structure fabricated in such a manner that an Al film having a thickness of 3 to 4 μm is coated by an ion plating or like method onto one surface of an isotropic thin ribbon having a thickness of about 40 μm which is formed such that a molten alloy having a composition of $Pr_9Fe_{73}Co_9B_7V_1Nb_1$ is melt-spun and heat-treated and which is composed of an αFe and a crystallized $Pr_2Fe_{14}B$.

In this connection, a relative density of approximately 80% is observed in a bonded magnet with a density of 6 Mg/m³ which is fabricated such that the above described isotropic thin ribbon having a thickness of about 40μ (which is formed such that a molten alloy having a composition of $Pr_9Fe_{73}Co_9B_7V_1Nb_1$ is melt-spun and heat-treated and which is composed of an αFe and a crystallized $Pr_2Fe_{14}B$) is crushed to 150 μm or less and cured with an epoxy resin. Also, the above bonded magnet has a remanence Mr of 0.73 T, a coercivity HcJ of 626 kA/m and a $(BH)_{max}$ of 80 kJ/m³. When these figures are compared with those of the magnet of the thick film magnet according to the present invention (in-plane remanence Mr=0.95 T; coercivity HcJ=645 kA/m, and $(BH)_{max}$=138 kJ/m³), it is found out that the conventional bonded magnet disclosed by, for example, Topfer et al., T. Speliotis et al., or H. Komura et al. has inferior magnetic properties, specifically 76.8% in remanence Mr, 97.1% in coercivity HcJ, and 58% in $(BH)_{max}$ thus showing significantly lower values in remanence Mr and $(BH)_{max}$, which prohibits the conventional bonded magnet from performing comparably to the micro rotor according to the present invention.

According to the present invention, in the thick film magnet including a magnet having a thickness $t_1$ and a non-magnetic material having a thickness $t_2$, the ratio of $t_1/t_2$ is set at eight or more. In this connection, when the plurality of thick film magnets, which are stacked on one another in the rotation axis direction in a predetermined number of layers thus forming an isolated lamination thick film magnet, are fixed to one another via an adhesion layer, it is preferable that the adhesion layer is regarded as a part of the non-magnetic material so that the thickness $t_2$ is defined by the aggregate thickness of the non-magnetic material and the adhesion layer. The plurality of thick film magnets stacked on one another in the rotation axis direction may alternatively be fixed to one another by means of connection utilizing plastic deformation due to heat and pressure. Also, for the purpose of reducing eddy current loss associated with a high speed rotation, the plurality of thick film magnets may be pressure-bonded to one another via a heat-resisting polymer, such as polyimide, having a thickness of several μm, thereby increasing electric specific resistance between two adjacent layers. The reason the thick film magnets are fixed to one another by utilizing pressure is that the relative density of the magnets of the thick film magnets of the isolated lamination thick film magnet (volume fraction of the magnets in the isolated lamination thick film magnet) with respect to the rotation axis direction (stacking direction) can be 80% or more.

In this connection, the relative density (volume fraction) of a magnetic material in a bonded magnet can be about: 80% by compression molding; 78% by intrusion molding; 65% by calendaring; 62% by injection molding; and 60% by slurry casting or screen printing. So, in the thick film magnets of the isolated lamination thick film magnet according to the present invention which each include a magnet having a thickness $t_1$ and a non-magnetic material having a thickness $t_2$, when the ratio of $t_1/t_2$ is set at eight or more, the relative density of the magnets in the isolated lamination thick film magnet with respect to the rotation axis direction can be equal to or larger than that of the bonded magnet, and if the reluctance of the magnet in the in-plane direction is minimized, the remanence Mr and the $(BH)_{max}$ are hard to be degraded and also the magnet can be structured of a uniform magnetic material with respect to the magnetization direction in the plane.

Figure 1C:
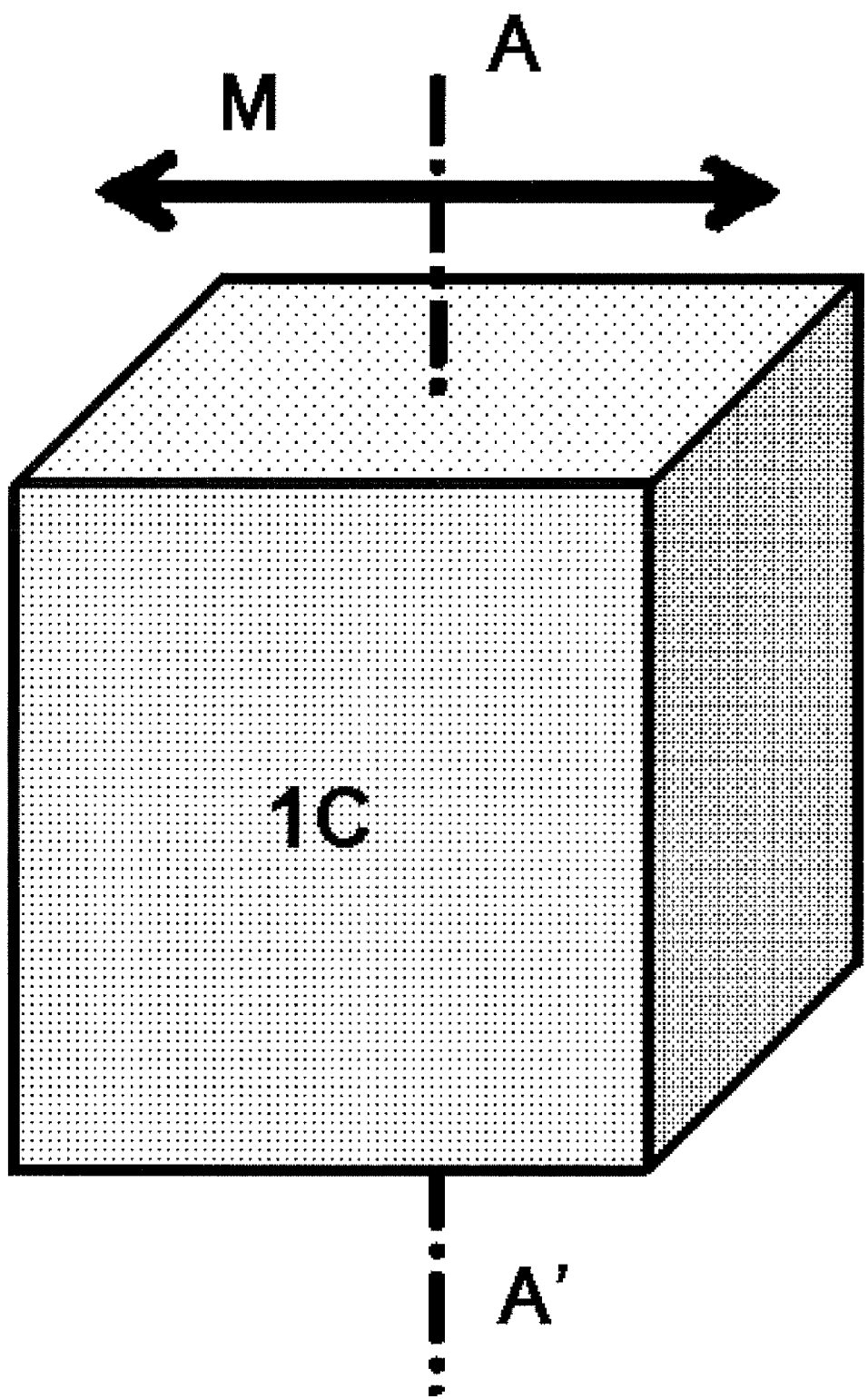

Next, description will be made, with reference to FIGS. 1A, 1B and 1C, of in-plane multi-polar magnetization of an isolated lamination thick film magnet formed such that a predetermined number of thick film magnets each including a magnet and a non-magnetic material are stacked on one another in the rotation axis direction. FIG. 1A is schematic view of reluctance distribution of an isolated lamination thick film magnet according to the present invention, FIG. 1B is a schematic view of reluctance distribution of a bonded magnet, and FIG. 1C is schematic view of reluctance distribution of an anisotropic bulk magnet fabricated by a die-upset method or a sintering method. In FIGS. 1A, 1B and 1C, line A-A' indicates the center of the rotation axis, and arrowed line M indicates the direction and magnitude of magnetization in a relative manner. 1a refers to a magnet (film or thin ribbon) according to the present invention, 2a refers to a non-magnetic material to isolate adjacent two of the magnets 1a two-dimensionally, 1b refers to a magnetic powder or magnetic particle, 2b refers to a binder to divide the magnetic powder (or magnetic particle) 1b of the bonded magnet three-dimensionally, and 1c refers to an anisotropic bulk magnet with C axes aligned in one direction.

Referring to FIG. 1A, the present invention is characterized in that a plurality of thick film magnets each including a magnet and a non-magnetic material are alternately stacked on one another thus forming an isolated lamination thick film magnet as a micro rotor. Specifically, in the conventional arts as disclosed in, for example, Japanese Patent Application Laid-Open Nos. H4-340352, H5-30717, H8-83713 and H9-7833, a structure, which is constituted by one film magnet (1a) formed by a physical deposition method on the base member (2a), is used simply as a micro rotor, thus failing to teach that an isolated lamination thick film magnet constituted by a plurality of magnets (film magnets) 1a and a plurality of non-magnetic materials (base members) 2a is used as a micro rotor.

The present invention is characterized in that the plurality of film magnets 1a and the plurality of non-magnetic materials 2a are alternately stacked on one another wherein the magnetic properties, the number of pole pairs, the permeance (B/μoH) of magnetic path of in-plane direction achieved by the magnet alone, and the like are specified.

The magnets shown in FIGS. 1A and 1B are both magnetically isotropic and therefore can be in-plane magnetized with two or more pole pairs. On the other hand, since the bulk magnet 1c shown in FIG. 1C is magnetized only in the anisotropy direction shown by the arrowed line M, the number of pole pairs is limited to one. For example, in the case of a micro magnet having a diameter of 1 mm, the magnetic pole pitch is 0.785 mm (π/4). In the case of the isolated lamination thick film magnet according to the present invention where two adjacent magnets 1a are isolated by the non-magnetic material 2a, when the magnet 1a is magnetized in the in-plane direction shown by the arrowed line M, the magnetic path is free from such an element as the binder 2b of FIG. 1B to increase reluctance. Also, unlike the bulk magnet 1c shown in FIG. 1C, with respect to the magnet 1a of the isolated lamination thick film magnet shown in FIG. 1A, the magnetic path of in-plane direction is isolated with the non-magnetic material 2a. Consequently, the isolated lamination thick film magnet of FIG. 1A can have two or more pole pairs and be provided with a mean magnetic path of in-plane direction having a permeance (B/μoH) of five or more achieved by the magnet alone.

Figure 2:
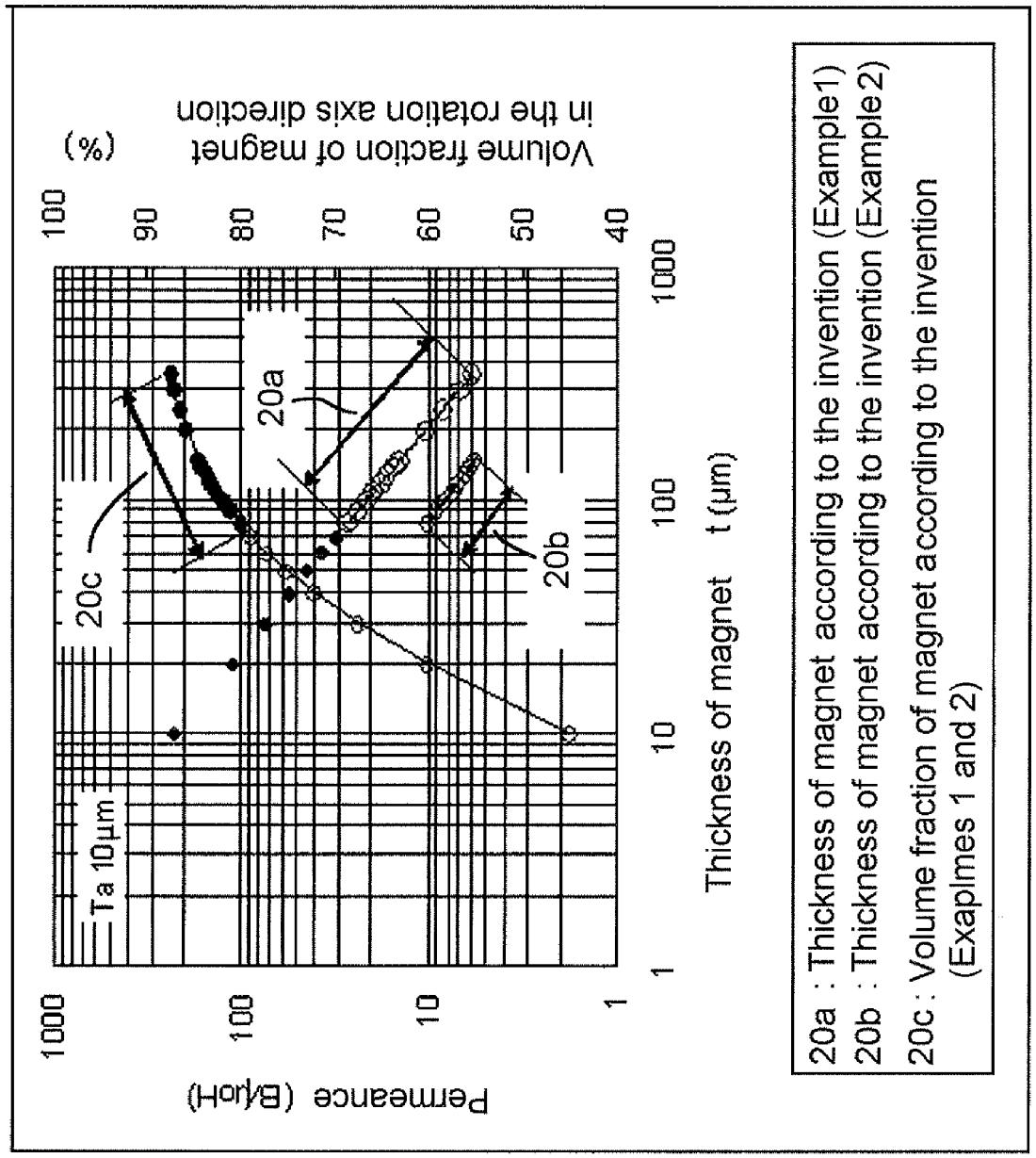
FIG. 2 in a characteristic chart of a relationship between a thickness and a permeance (B/μoH) in terms of a magnet taken by itself alone.

Now, description will be made, with reference to FIG. 2, of the mean magnetic path of in-plane direction having a permeance (B/μoH) of five or more achieved by the magnet alone according to the present invention. FIG. 2 is a characteristic chart of a relationship between the thickness of the magnet 1a alone of FIG. 1A and the permeance (B/μoH) of the magnet 1a alone in the isolated lamination thick film magnet according to the present invention wherein the non-magnetic material 2a to isolate between adjacent two of the magnets 1a has a thickness of 10 μm. Referring to FIG. 2, Instance 1 indicates the case where the magnetic path length is defined by a distance between the centers of opposite polarities and the polarity width is defined by 50% of the mechanical angle of the magnetic pole when the magnet 1a of the isolated lamination thick film magnet according to the present invention has a diameter of 1 mm and is in-plane magnetized with two pole pairs from the outer circumference of the magnet 1a, and Instance 2 indicates the case where the magnetic path length is defined by a distance between the centers of opposite polarities and the polarity width is defined by 50% of the mechanical angle of the magnetic pole when the magnet 1a has a diameter of 1.3 mm and is in-plane magnetized with ten pole pairs from the outer circumference of the magnet 1a.

As is clear from FIG. 2, when the non-magnetic material 2a to isolate two adjacent magnets 1a has a thickness of 10 μm, the thickness of the magnet 1a is required to range from about 80 to 350 μm in Instance 1 and from about 80 to 150 μm in Instance 2 in order to enable the mean magnetic path of in-plane direction to achieve a permeance (B/μoH) of five or more by the magnet alone. On the other hand, if the thickness of the magnet 1a is below 80 μm, the magnet 1a has an increased permeance (B/μoH) achieved by the magnet alone, but the volume fraction of magnet in the rotation axis direction is less than 80% resulting in a significant deterioration in volume fraction of magnet unfavorably in terms of use as a micro rotor.

In this connection, when the magnet 1a is to be formed to have a predetermined thickness at a high speed by a physical deposition method, a PLD (pulse laser deposition) method may be used. In the meantime, it is taught that when, for example, a molten alloy having a composition of $Nd_4Fe_{77.5}B_{18.5}$ is rapidly cooled and solidified at a single roll surface speed of 3 to 7 m/sec at an ambient pressure of 1.3 kPa, a rapidly-solidified $F_3B/Nd_2Fe_{14}B$ thin ribbon having a thickness of 100 to 300 μm in the as-spun state can be obtained (refer to Journal of the Magnetics Society of Japan—Volume 22 (1998), pp. 385-387, by Kanekiyo and Hirosawa). In the present invention, such a rapidly-solidified thin ribbon, if provided with a remanence Mr of 0.9 T or more and a coercivity HcJ of 400 kA/m or more, may be successfully used together with a non-magnetic material to isolate between the thin ribbons.

As described above, the isolated lamination thick film magnet used as a micro rotor according to the present invention includes a plurality of thick film magnets which each include an isotropic magnet with a thickness $t_1$ having a remanence Mr of 0.95 T or more and a coercivity HcJ of 400 kA/m or more and a non-magnetic material with a thickness $t_2$ adapted to isolate two adjacent isotropic magnets where the ratio of $t_1/t_2$ is set at eight or more, and which are stacked on one another in the rotation axis direction in a predetermined number of layers, wherein two or more pole pairs are provided, and also a an in-plane mean magnetic path is provided which has a permeance (B/μoH) of five or more achieved by the magnet alone. Preferably, the thick film magnets are punched out into a circular or annular plate.

When the isolated lamination thick film magnet as a micro rotor according to the present invention is used in the slotless radial gap type brushless DC motor, the PM stepping motor or the electric generator as a driving source of advanced electric and electronic devices, the dimension, profile, weight and power consumption of such devices can be reduced.

The present invention will be further detailed by way of exemplary embodiments but is by no means limited thereto.

First, description will hereinafter be made, with reference to the accompanying drawings, of the method of fabricating, by a PLD method, the thick film magnets of the isolated lamination thick film magnet as a micro rotor according to the present invention which each include an isotropic magnet with a thickness $t_1$ having an in-plane remanence Mr of 0.95 T or more and a coercivity HcJ of 400 kA/m or more and a non-magnetic material with a thickness $t_2$ adapted to isolate two adjacent isotropic magnets wherein the ratio of $t_1/t_2$ is set at eight or more, and description will also be made of the method of heat-treating Fe—Pt and αFe/R-TM-B.

Figure 3:
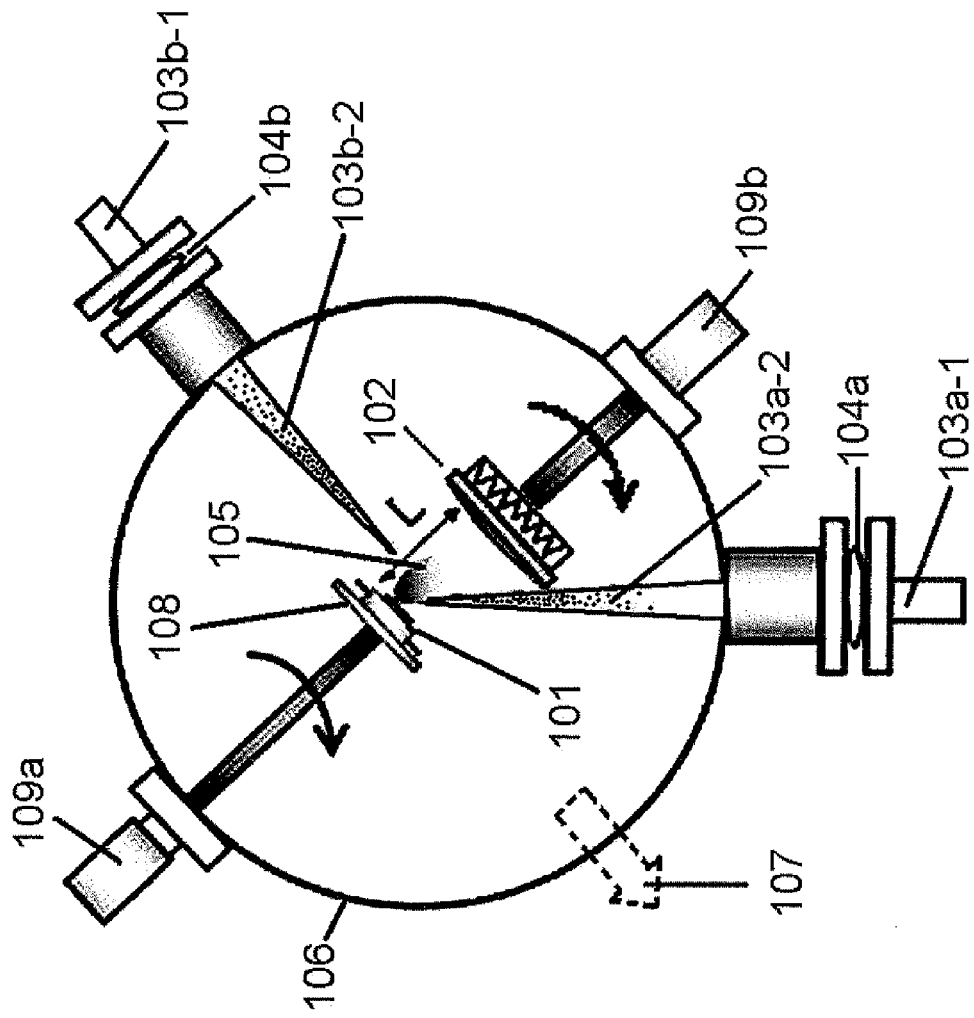
FIG. 3 is a schematic view of a relevant portion of a film forming device.

FIG. 3 schematically shows a relevant portion of a PLD device to form the thick film magnets, wherein 101 refers to a target, 1022 refers to a Ta substrate which may be composed 100% of Ta or include a Ta buffer layer, 103a-1 refers to a main laser, 104a refers to a first lens, 103a-2 refers to a main irradiation laser condensed by the first lens 104a, 103b-1 refers to a subsidiary laser, 104b refers to a second lens, 103b-2 refers to a subsidiary irradiation laser condensed by the second lens 104b, and 106 refers to a vacuum chamber which is provided with an exhaust system 107. The target 101 is placed on a support plate 108 rotatably disposed and a rotary machine 109s is driven in a controlled manner, whereby αFe and Nd—Fe—B alternately receive the main irradiation laser 103a-2. Further, 105 refers to a plume generated in such a way that atom (molecule) is stripped off (abrasion) when the target 1 receives the main irradiation laser 103a-2. Also, the Ta substrate 102 having a dimension of 25 mm×25 mm with a thickness of 10 μm is rotatably jointed to a drive device 109b. In this connection, it is preferable that the subsidiary irradiation laser 103b-2 is applied to the generated plume to thereby remove droplets from the film formed.

In the above described film formation of Fe—Pt or αFe/Nd—Fe—B, the pressure inside the vacuum chamber was set at $1\times10^{-4}$ to $3\times10^{-4}$ Pa by means of the exhaust system 107 and then the main irradiation laser (YAG laser) 103a-2 having an energy of 340 mJ was applied to the target 101 at a pulse frequency of 30 Hz for 60 to 189 min. As a result, a film having a thickness of about 80 to 300 μm was obtained, which means that a deposition layer of about 1 nm was formed per pulse.

Then, the Fe—Pt film substrate was subjected to order-disorder transformation at a maximum achievable temperature of 400° C. without retention time. Also, in the αFe/Nd—Fe—B film substrate, Nd—Fe—B was crystallized at a temperature rise rate of 150° C./min, a maximum achievable temperature of 650° C. and no retention time, and $Nd_2Fe_{14}B$ was formed.

Figure 4A:
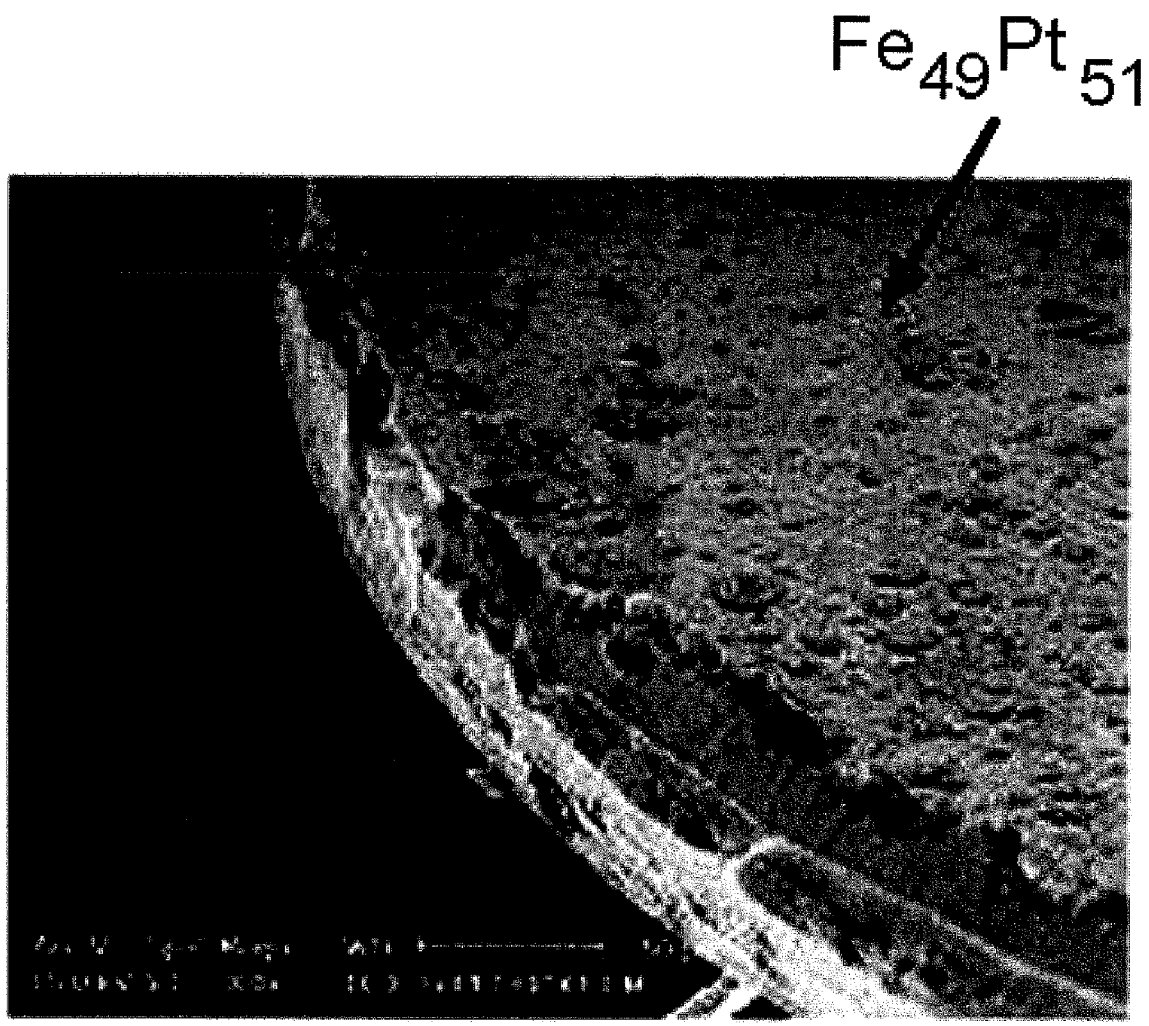
FIGS. 4A and 4B are respectively an enlarged perspective view and a top plan view of an annular plate-shaped thick film magnet of the isolated lamination thick film magnet including a magnet and a non-magnetic material with isolation function.
Figure 4B:
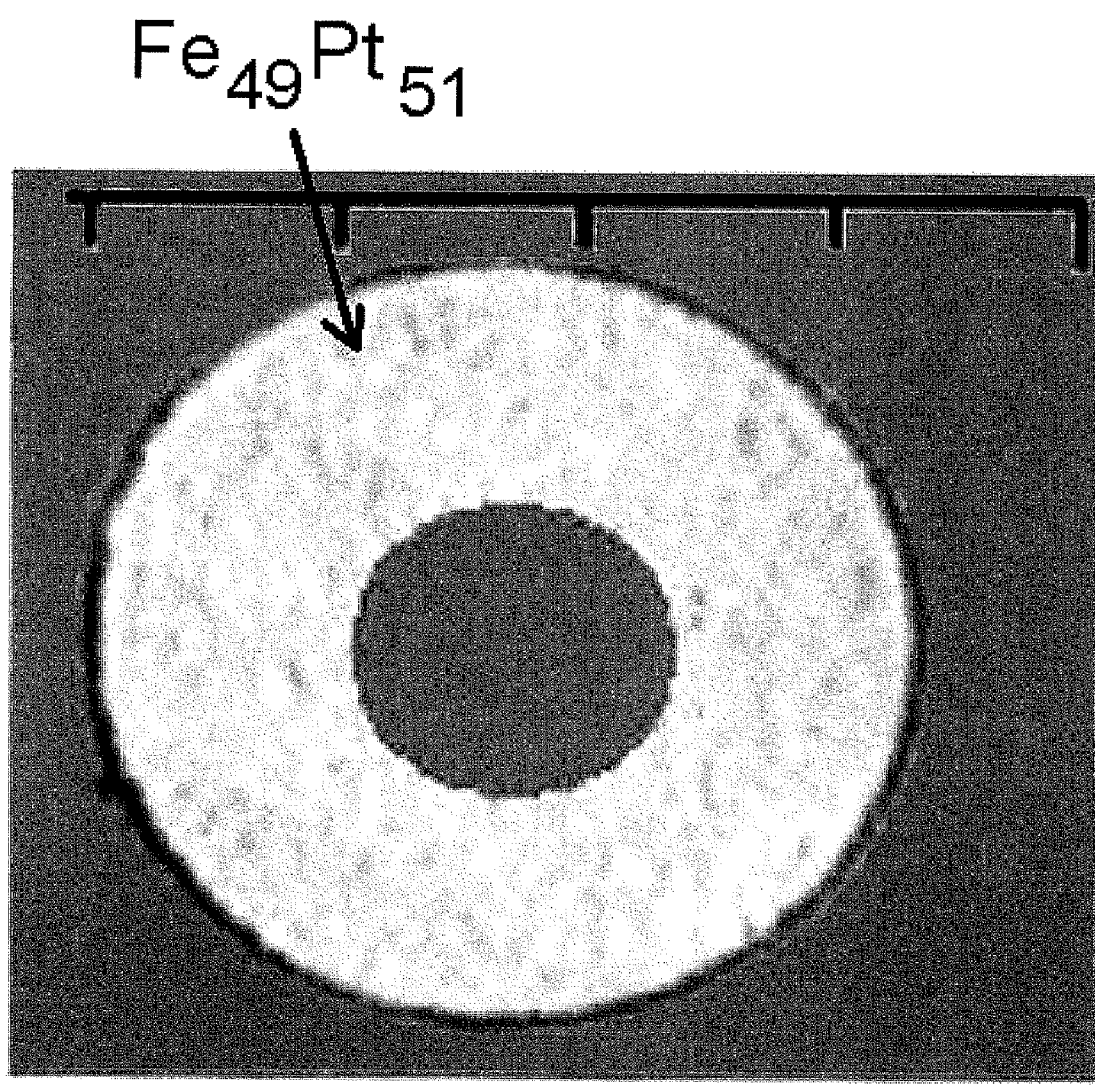

Subsequently, the Fe—Pt film and the αFe/Nd—Fe—B film both having a thickness of 80 to 300 μm each together with the Ta substrate having a thickness of 10 μm were punched out, and annular plate-shaped thick film magnets according to the present invention each including a magnet and a non-magnetic material with isolation function and having an outer diameter of 1 mm and an inner diameter of 0.6 mm were obtained (refer to FIG. 4A/4B). The thick film magnet with the Fe—Pt film fabricated as described above achieved an in-plane direction remanence Mr of 0.95 T, a coercivity HcJ of 515 kA/m and a $(BH)_{max}$ of 138 kJ/M³, while the thick film magnet with the $αFe/Nd_2Fe_{14}B$ film achieved an in-plane direction remanence Mr of 1 T, a coercivity HcJ of 427 kA/m and a $(BH)_{max}$ of 90 kJ/m³. In the present invention, the Fe—Pt system thick film magnet is referred to as Embodiment Example 1 and the $αFe/Nd_2Fe_{14}B$ system thick film magnet is referred to as Embodiment Example 2.

On the other hand, an Al film having a thickness of 10 μm was layered by ion plating on the free face of an isotropic thin ribbon having a thickness of 80 μm which is formed such that a molten alloy having a composition of $Nd_4Fe_{77.5}B_{18.5}$ was rapidly cooled and solidified, and crystallized at 650° C. and which is composed of an $Fe_3B$ and an $Nd_2F_{14}B$, and the isotropic thin ribbon with an Al film layered thereon was punched out into an annular plate shape, whereby an thick film magnet according to the present invention was obtained which includes a magnet and a non-magnetic material with isolation function and which has an outer diameter 1 mm and an inner diameter 0.6 mm. The thick film magnet obtained as describe above achieved an in-plane remanence Mr of 1.05 T, a coercivity HcJ of 400 kA/m and a $(BH)_{max}$ of 102 kJ/m³ and is referred to as Embodiment Example 3 in the present invention.

The magnet side face of each of the thick film magnets according to Embodiment Examples 1, 2 and 3 of the present invention is layered with a polyimide film defined by a chemical formula below and having a thickness of about 3 μm. The polyimide film has a heat tolerance that is specified such that Td5 (thermal decomposition temperature of 5% weight loss measured by thermo gravimetric analysis (TAG)) reaches about 550° C.

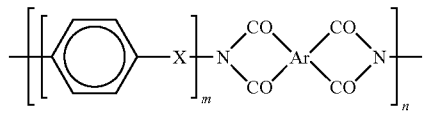

A plurality of the above thick film magnets according to Embodiment Examples 1 to 3 of the present invention, which were each layered with a polyimide film and which were formed into an annular plate with an outer diameter of 1 mm and an inner diameter of 0.6 mm, were put into a forming mold, where the thick film magnets were stacked on one another so as to have a stacking dimension of 5 mm. The thick film magnets stacked on one another in the mold were then compressed at 250° C. under a pressure of 50 MPa, cooled and released from the mold, thus forming an isolated lamination thick film magnet with a magnet volume fraction of 81%.

The above described isolated lamination thick film magnet as a micro rotor according to Embodiment Examples 1 to 3 of the present invention was fabricated such that a plurality of annular plate-shaped thick film magnets, which each include an isotropic magnet with a thickness $t_1$ having an in-plane remanence Mr of 0.95 T or more and a coercivity HcJ 400 kA/m or more and a non-magnetic material with a thickness $t_2$ adapted to isolate between two adjacent magnets where the ratio of $t_1/t_2$ is set at eight, were stacked on one another in the rotation axis direction so as to achieve a magnet volume fraction of 81%, heated to above 320° C. and then cooled in the magnetic field, whereby a micro rotor was obtained which has two pole pairs as shown in FIG. 5A and which is provided with a mean magnetic path of in-plane direction having a permeance (B/μoH) of five achieved by the magnet alone. Further, a rotary electric machine (radial gap type motor) according to the present invention as shown in FIG. 5B/5C (FIG. 5B is a cross sectional view of a portion of the rotary electric machine located toward the right side of line A-A' in FIG. 5C) was produced using the micro rotor (isolated lamination thick film magnet) fabricated as described above.

In FIGS. 5A, 5B and 5C, 1 refers to a thick film magnet including a magnet and a non-magnetic material with isolation function, 2 refers to a rotation axis, 3 refers to a bearing, 4 refers to an excitation winding, 5 refers to a stator core, and 6 refers to a housing. $1n$ refers to a part (right hand side portion) of an isolated lamination thick film magnet which is used as a micro rotor according to the present invention and has a diameter of about 1.5 mm or less, and which includes a plurality of the aforementioned thick film magnets 1 stacked on one another in the rotation axis direction. Referring to FIGS. 5B and 5C, in the rotary electric machine, two excitation windings 4 (only one winding is shown in FIG. 5B) are disposed to face respective axial ends of the isolated lamination thick film magnet (micro rotor) $1n$, and stator teeth $5a$ and $5b$ of the stator core 5 are disposed radially outside the isolated lamination thick film magnet $1n$. When a pulse current is applied to the excitation winding 4, the stator teeth $5a$ and $5b$ of the stator core 5 are magnetized with respective opposite polarities, and the isolated lamination thick film magnet (micro rotor) $1n$ is caused to rotate by means of electromagnetic force generated between the magnetic poles of the isolated lamination thick film magnet $1n$ and the stator teeth $5a$ and $5b$ of the stator core 5. The rotation torque is proportional to the pole pair number and the magnetic flux Bd of the isolated lamination thick film magnet $1n$.

FIG. 6 shows a relationship between the magnetic flux Bd and the permeance (B/μoH) of the isolated lamination thick film magnet (micro rotor) in on Embodiment Examples 1 to 3 of the present invention. Also shown in FIG. 6 is a corresponding relationship on Comparative Examples 1, 2 and 3, wherein Comparative Example 1 is an $Nd_2Fe_{14}B$ system sintered magnet having a remanence Mr of 1.48 T, Comparative Example 2 is an $Nd_2Fe_{14}B$ system sintered magnet having a remanence Mr of 1.20 T, and Comparative Example 3 is an $\alpha Fe/Nd_2Fe_{14}B$ system isotropic bonded magnet having a remanence Mr of 0.73 T.

As clear from FIG. 6, since the micro rotor (isolated lamination thick film magnet in) according to the present invention for use in the radial gap type motor shown in FIG. 5B/5C is of multilayer structure which includes a plurality of thick film magnets each including a magnet and a non-magnetic material with isolation function and stacked on one another, which is multi-polar magnetized in an arbitrary in-plane direction and which has a small reluctance, the permeance (B/μoH) of the magnet alone can be adapted to reach a value of five or more. Accordingly, the isolated lamination thick film magnet in is magnetically isotropic but can achieve an unconventionally high magnetic flux Bd value comparable to that of an anisotropic magnet and also is favorable in terms of demagnetization. Moreover, the isolated lamination thick film magnet is adapted to suppress temperature rise caused due to eddy current loss resulting from a high speed rotation and therefore can be used as a component of a micro stator for a rotary electric machine, for example a radial gap type motor shown in FIG. 5B/5C, more advantageously than conventional isotropic or anisotropic magnets represented by, for example, Comparative Examples 1 to 3.

The micro rotor according to the present invention can be extensively used for industrial application, specifically in a radial gap type motor of high torque density, a PM stepping motor or an electric generator, though not limited thereto.

What is claimed is:

1. A micro rotor comprising a plurality of thick film magnets having one of circular and annular plate shape, which each comprise an isotropic magnet with a thickness $t_1$ having an in-plane remanence Mr of 0.95 T or more and a coercivity HcJ of 400 kA/m or more and a non-magnetic material with a thickness $t_2$ adapted to isolate two adjacent isotropic magnets where a ratio of $t_1/t_2$ is eight or more, and which are stacked on one another in multiple layers in a rotation axis direction such that the non-magnetic material is located between the two adjacent isotropic magnets, wherein at least two pole pairs are provided and a mean magnetic path of in-plane direction is provided which has a permeance (B/μoH) of five or more achieved by the magnet alone.

2. A micro rotor according to claim 1, wherein the thick film magnet is constituted such that the isotropic magnet is formed by a physical deposition method on the non-magnetic material as a substrate, and that the isotropic magnet formed is subjected to heat treatment as appropriate thereby controlling coercivity HcJ.

3. A micro rotor according to claim 1, wherein the thick film magnet is constituted such that the isotropic magnet is formed by depositing a disordered Fe—Pt system alloy and then formed into an ordered Fe—Pt system alloy.

4. A micro rotor according to claim 1, wherein the thick film magnet is constituted such that the isotropic magnet comprises an αFe and a crystallized $R_2TM_{14}B$ which are formed in such a manner that an αFe having an average deposition layer thickness of 60 nm or less and an R-TM-B having an average deposit layer thickness of 60 nm or less are deposited alternately on each other and then subjected to heat treatment.

5. A micro rotor according to claim 1, wherein the non-magnetic material comprises one of Ta and a Ta buffer layer.

6. A micro rotor according to claim 1, wherein the thick film magnet is constituted such that the isotropic magnet comprises a rapidly-solidified thin ribbon formed by either crystallizing or nitriding a molten alloy of one of an R-TM-B (R is one of Nd and Pr, and TM is one of Fe and Co) system alloy and an Sm—Fe system alloy, and that the non-magnetic material comprises a non-magnetic metal coated by a physical deposition method on a surface of the thin ribbon.

7. A micro rotor according to claim 1, wherein the thick film magnet is formed into one of a circular plate shape and an annular plate shape by a punching method.

8. A rotary electric machine comprising the micro rotor described in claim 1.

9. A slotless radial gap type brushless DC motor comprising the micro rotor described in claim 1.

10. A PM stepping motor comprising the micro rotor described in claim 1.

11. An electric generator comprising the micro rotor described in claim 1.

* * * * *